(12) United States Patent
Addiego et al.

(10) Patent No.: US 7,541,303 B2
(45) Date of Patent: Jun. 2, 2009

(54) HIGH POROSITY CORDIERITE CERAMIC HONEYCOMB ARTICLE AND METHOD

(75) Inventors: William Peter Addiego, Big Flats, NY (US); Isabelle Marie Melscoet-Chauvel, Painted Post, NY (US)

(73) Assignee: Corning Incorporated, Corning, NY (US)

(*) Notice: Subject to any disclaimer, the term of this patent is extended or adjusted under 35 U.S.C. 154(b) by 695 days.

(21) Appl. No.: 11/316,294

(22) Filed: Dec. 21, 2005

(65) Prior Publication Data

US 2007/0142208 A1 Jun. 21, 2007

(51) Int. Cl.
*C04B 35/195* (2006.01)
*C04B 38/06* (2006.01)

(52) U.S. Cl. .............. 501/80; 501/81; 501/82; 501/119; 264/43; 264/44; 264/631

(58) Field of Classification Search .......... 501/81, 501/82, 83, 119; 264/43, 44, 631; 428/116
See application file for complete search history.

(56) References Cited

U.S. PATENT DOCUMENTS

| | | | | |
|---|---|---|---|---|
| 5,258,150 | A | 11/1993 | Merkel et al. ............... 264/43 |
| 6,284,693 | B1* | 9/2001 | Beall et al. ................. 501/119 |
| 6,432,856 | B1 | 8/2002 | Beall et al. ................. 501/118 |
| 6,803,086 | B2* | 10/2004 | Noguchi et al. ............. 428/116 |
| 6,818,580 | B2 | 11/2004 | Kumazawa et al. ......... 501/119 |
| 6,827,754 | B2 | 12/2004 | Suwabe et al. ............... 55/523 |
| 6,864,198 | B2 | 3/2005 | Merkel ........................ 501/80 |
| 7,300,898 | B2* | 11/2007 | Wusirika .................... 501/119 |
| 7,442,425 | B2* | 10/2008 | Fu et al. ..................... 428/116 |
| 2003/0039598 | A1 | 2/2003 | Nishimura et al. .......... 422/177 |
| 2003/0165661 | A1* | 9/2003 | Noguchi et al. ............. 428/116 |
| 2004/0152593 | A1 | 8/2004 | Cutler et al. ................. 502/439 |
| 2004/0261384 | A1 | 12/2004 | Merkel et al. ................ 55/523 |
| 2005/0069469 | A1 | 3/2005 | Fu et al. ..................... 422/177 |

FOREIGN PATENT DOCUMENTS

EP 0 753 490 1/2003

* cited by examiner

*Primary Examiner*—Karl E Group
(74) *Attorney, Agent, or Firm*—Matthew B. McNutt

(57) ABSTRACT

The present invention provides materials and methods for the manufacture of high porosity ceramic exhaust filters employing relatively low amounts of pore formers, the filters combining efficient diesel particulate filtration with effective support for exhaust emissions control catalysts. Cordierite-forming ceramic batches comprising non-hydrated transition alumina powders of relatively large particle size provide high porosities with well-controlled pore sizes and with low filter thermal expansion coefficients and good mechanical strengths.

12 Claims, 2 Drawing Sheets

HIGH POROSITY CORDIERITE CERAMIC HONEYCOMB ARTICLE AND METHOD

TECHNICAL FIELD AND INDUSTRIAL

The present invention relates to a porous cordierite ceramic honeycomb article and a batch and method for manufacturing the same. More particularly, the invention is directed to a cordierite honeycomb article having improved, or substantially the same porosity while using substantially lower amounts of a pore former in the batch material.

BACKGROUND OF THE INVENTION

Diesel engines provide lower emissions and increased fuel economy as compared to gasoline engines; however, environmental and health hazards are posed by diesel exhaust emissions. In particular, diesel particulate filters control particulate emissions by physically trapping soot particles in their structure.

Diesel particulate filters are preferably constructed as honeycomb wall-flow monoliths, which allow exhaust gases to flow through their porous ceramic walls, while any particulate present in the exhaust gas is collected on the upstream side of the wall. Once a predetermined condition is met, the filter may be cleaned by a regeneration cycle, during which the temperature of the exhaust gas is high enough to ignite and burn out any soot particulate. This regeneration cycle reduces the backpressure of the diesel particulate filter near to that of a new filter.

The surface of the walls or the porous interior of the walls of diesel particulate filters may include a catalyst washcoat containing catalysts such as platinum (Pt), palladium (Pd), iron (Fe), strontium (Sr), cerium (Ce), or other transition metal or rare earth elements. Such catalysts can operate to lower the temperatures required for the regeneration of the filter, and to convert hydrocarbons, carbon monoxide and/or oxides of nitrogen in the exhaust gases into water vapor, carbon dioxide and/or harmless nitrogen compounds.

One preferred material for the manufacture of high temperature components is cordierite ($Mg_2Al_4Si_5O_{18}$), a magnesium aluminum silicate that often includes low levels of iron or other impurities. Cordierite ceramics have a low coefficient of thermal expansion (CTE), high strength and are resistant to thermal shock. Cordierite materials are commercially manufactured by mixing a raw batch including talc, alumina, aluminum hydroxide, kaolin clays, and silica. The batch is then blended with a binder such as methylcellulose and lubricants such as sodium stearate to form a plastic mixture that is formed into a green body, dried, and reaction-sintered.

Typically, high porosity honeycomb bodies for applications such as particulate filters include large concentrations of pore formers such as graphite, starch, or other pore forming materials. The use of graphite is favored, but presents many difficulties in the manufacture of the body. Typically, bodies with high loadings of graphite have a decreased dielectric constant, which decreases the efficiency of dielectric or microwave drying. Another difficulty with graphite is the exothermic reaction caused during initial heating in the range 650° C. to 1000° C., which initiates combustion of the graphite. Careful control of the firing process during the graphite burnout stage is required in order to control the graphite combustion rate.

Commonly assigned U.S. Pat. No. 6,864,198 discloses a method of forming cordierite honeycomb structures, including honeycombs meeting specific porosity and pore size distribution requirements for low-pressure drop filters, made in accordance with the patent through the use of batches containing fine talc. However, one difficulty with highly porous cordierite ceramics such as these can be reduced strength, since the high porosities required to achieve low pressure drops in exhaust filters reduce the structural density and/or toughness of the honeycomb wall structures. Other methods for manufacturing highly porous cordierite honeycombs are disclosed in U.S. Pat. Nos. 5,258,150 and 6,818,580, the latter patent disclosing cordierite-forming batches wherein alumina of moderate particle size comprises one of the batch constituents.

In light of the above concerns, cordierite honeycomb articles having increased or substantially similar porosity that can be made with lower concentrations of pore former, especially including lower graphite loadings, are much sought after. Such decreases in pore former loadings cannot, however, come at the expense of other important properties directly impacted by porosity, such as, for example, clean (soot-particle-free) pressure drop and filtration efficiency. Accordingly, there remains a need for cordierite ceramic honeycombs that exhibit high porosity and filtration efficiency as well as high strength, and that can be made while reducing the amount of pore former used in the cordierite batch material.

SUMMARY OF THE INVENTION

The method of the present invention provides for the manufacture of a honeycomb wall flow filter using reduced amounts of graphite pore former materials, while maintaining high filter porosity and high filtration efficiency in the filter product. In one aspect of that method, highly porous ceramic matrices are provided from batches comprising reduced additions of pore formers such as graphite through the inclusion in those batches of relatively coarse, high surface area alumina powders. For example, coarse, high-surface-area, transition phase aluminas can be substituted for most or all of the hydrated aluminas commonly used in wall flow filter batches of the prior art. The coarse transition phase aluminas generate in-situ porosity that allows for the reduction of problematic pore formers such as graphite to the batch.

Reductions in the amounts of graphite added to such batches result in reduced batch costs, since graphite is an expensive raw material relative to silica and alumina. Other advantages include reduced wear rate in the honeycomb dies used to form the batches into honeycombs, improved drying of the extruded honeycombs, and reduced complexity and length of the firing cycle. And, the batches of the present invention are readily extrudable to form honeycomb filter substrates with good quality matrix and skin.

The use of controlled firing atmospheres and/or extended firing cycles, which are typically required during the burnout stage in the processing of extruded honeycombs incorporating high amounts of a graphite pore former, are largely avoidable with the compositions of the present invention. Extruded honeycombs made in accordance with the invention may instead be fired to obtain crack-free fired honeycombs without atmosphere control during binder and pore former burnout.

BRIEF DESCRIPTION OF THE DRAWINGS

The invention is further described below with reference to the appended drawings, wherein.

DETAILED DESCRIPTION

Figure 1:
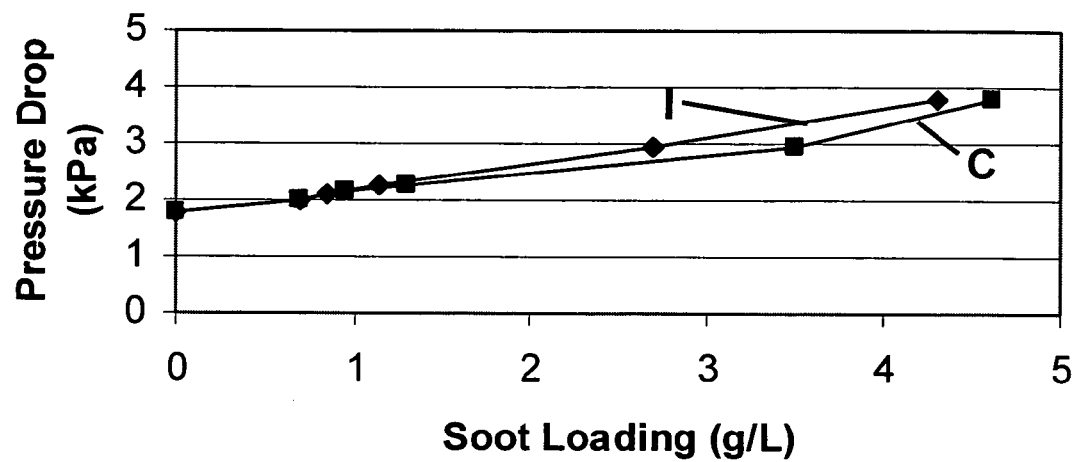
FIG. 1 is a plot of pressure drop in kPa versus soot loading in g/L comparing the pressure drop performance of an article formed in accordance with the present invention with that of an article formed in accordance with the prior art.

Extruded ceramics of cordierite ($Mg_2Al_4Si_5O_{18}$) composition are generally produced from batch mixtures that include (i) oxide sources of magnesia, alumina and silica in proportions effective to yield a ceramic article incorporating a predominant (80 wt % or higher) cordierite crystal phase upon firing, and (ii) one or more binders and lubricants. Where a high porosity ceramic (i.e., with a porosity of at least 50% and more typically at least 60% by volume) is required, the batch will further include a pore former in a proportion effective to develop such levels of porosity in the porous cordierite ceramic upon firing.

Raw batches containing the necessary oxide sources of magnesia, alumina and silica will generally include talc, alumina and/or aluminum hydroxides, kaolin clays, and silica. In conventional practice these dry batch constituents are blended with a binder such as methylcellulose, lubricants such as sodium stearate or aluminum tri-stearate, and pore formers such as graphite. The resulting dry mixtures are then blended with a water vehicle to form a plasticized batch mixture that can be formed into a green body by extrusion, and then fired.

The present invention substitutes high-surface-area or porous aluminum oxides for some of the graphite in these batches in order to maintain or increase the porosity of the sintered body at lower graphite levels. Alumina is a polymorph, in that it exists in several crystalline forms all having the same chemical formula. Hexagonal alpha alumina is the thermodynamically stable form of alumina at all temperatures. All other alumina crystalline structures are referred to as transition phase aluminas. The inclusion of amorphous, flash calcined aluminas or transition aluminas such as gamma, chi, kappa, delta, and theta aluminas in cordierite-forming batch mixtures has the effect of increasing the porosity of the finished honeycomb bodies.

Transition aluminas generally have lower densities than alpha alumina, but when heated will transform to alpha alumina and densify. Densification occurs during the sintering of a honeycomb preform, typically at temperatures of 800° C. to 1000° C., and the process is though to leave void spaces in the preform. Thus the transformation of these transition aluminas prior to the formation of cordierite likely increases the porosity of the finished honeycomb.

At temperatures above 1000° C., the alumina reacts with silica and magnesium sources to form cordierite. The voids caused by the densification or reaction of the alumina likely become pores in the finished cordierite honeycomb article. Thus high surface area transition aluminas have been found to provide the required porosity in the finished product without the addition of high levels of graphite.

Desirable transition aluminas useful in accordance with the invention include coarse aluminas, i.e. alumina powders with mean particle sizes of at least 15 μm and more generally in the range of 15-50 μm, and with surface areas of at least 100 $m^2$/g, more typically at least 300 $m^2$/g. Coarse powders are helpful in further improving the properties of porous fired cordierite products, in some cases increasing the mean pore size as well as the porosity of the fired honeycomb ceramic. These effects may be attributable to the poor packing density of the coarse particles within the unfired honeycomb ceramics.

An example of an alumina powder that is particularly well suited for use in the invention is one having a particle size distributions such that $d_{10}$ (the particle size at which 10% of the particles are smaller) is 2.648 μm, $d_{50}$ (the particle size at which 50% of the particles are smaller) is 15.78 μm and $d_{90}$ (the particle size at which 90% of the particles are smaller) is 54.37 μm. These particle sizes are significantly larger than the $d_{10}$=3.38 μm, $d_{50}$=5.8 μm and $d_{90}$=9.75 μm particle size distributions typical of many prior art alumina additions.

By using these larger particles, extruded honeycomb bodies provided in accordance with the invention can include a substantial number of large voids between the relatively large particles in the green or unfired structure. The use of alumina powders having a mean particle size of at least 15 μm in combination with talc and silica powders having mean particle sizes in excess of about 20 μm provides particularly low packing densities in the green ceramics because the substantially equal particle sizes inhibit the filling of interstices between large particles with smaller particles. The resulting reductions in graphite concentrations thus enabled are effective to reduce exothermic reactions upon firing and thus reduce the cracking of fired honeycomb articles.

In a particular example of the use of such an alumina, a coarse theta-alumina powder (i.e. a powder having a mean particle size of about 15 μm) having a surface area of more than 300 $m^2$/g, is found to be quite effective when used to enhance fired ceramic porosity in a graphite-containing cordierite batch. Suitable cordierite base batch compositions comprising such aluminas may include, in weight percent, 11-15% clay, 37-42% talc, 14-18% silica, 12-18% of a coarse transition alumina, and 28-34% total of coarse transition and other aluminas (e.g., alpha alumina and/or hydrous aluminas). The dry batch may further comprise up to 10% of cellulosic binders and up to 3% of lubricants.

The use of coarse high-surface-area alumina particles such as these facilitate substantial reductions in the amount of graphite or other pore formers in the batches. The concentrations of graphite pore formers in ceramic batches for highly porous filters can be as high as 80% by weight, calculated as a super-addition to 100% of a dry oxide-binder-lubricant batch base such as above described. In accordance with the invention, however, graphite super-additions of less than 50% by weight, or even less that 15-20% by weight of the base batch may be used without significantly sacrificing the porosity of the ceramic product. Thus the use of these coarse alumina powders can enable the production of very high porosities (porosities of 60% and more by volume) with substantially less than 80% by weight of graphite pore former added to the batches.

The highly porous cordierite ceramics use to provide honeycomb wall flow filters in accordance with the invention allow high catalyst washcoat loadings that provide for improved hydrocarbon, carbon monoxide, and $NO_x$, emissions control as well as improved soot filtration efficiency. The reduced levels of graphite in the batches allow shorter firing schedules that largely obviate the need for controlling the atmosphere during firing, and the resulting products retain acceptable coefficients of thermal expansion and mechanical strengths despite the high levels of porosity achieved. Moreover, the various processes that are known to occur during the firing of cordierite ceramics, such as glass formation and devitrification, solid-state diffusion, sublimation, solid-state reaction, liquid-sintering, and combustion, do not appear to adversely affect the integration of the interconnecting pore structure in cordierite ceramics made from these batches.

In a typical process for the manufacture of a honeycomb ceramic article in accordance with the invention, sources of the oxide cordierite constituents magnesia, alumina, and silica including clay, talc, alumina, and silica are mixed together in proportions that will form cordierite upon firing, with binders and lubricants being added to the dry mixture. Water is then added to form a slurry, which is then kneaded with one or more pore formers to form a plasticized batch that is extruded through a honeycomb die to form a honeycomb preform. The resulting preform is dried and fired to produce honeycomb ceramics structure of the present invention.

EXAMPLES

Specific examples of batches useful for the production of high-porosity cordierite honeycombs in accordance with the typical process described above are reported in Tables 1 and 2 below, along with two comparative examples (Examples 1 and 2) made with a large graphite pore former addition in accordance with prior practice. Descriptions of particular raw materials that may be used are included in Table 1, while batch mixtures comprising those raw materials are reported in Table 2.

TABLE 1

| Batch Materials | |
| --- | --- |
| Material | Descriptor |
| Talc A | Talc having a mean particle size of 25μ |
| Talc B | Talc having a mean particle size of 20μ |
| Silica A | Silica having a mean particle size of 25μ and a surface area of less than 10 m²/g |
| Silica B | Silica having a mean particle size of 21μ and a surface area of less than 10 m²/g |
| Alumina A (Alpha) | Alumina having a mean particle size of ~10μ a surface area of less than 20 m²/g |
| Alumina B (Alpha) | Alumina having a mean particle size of ~10μ a surface area of less than 20 m²/g |
| Alumina C (Chi, Gamma phase) | Alumina having a mean particle size of 15μ a surface area of greater than 340 m²/g |
| Aluminum Trihydrate | Aluminum Trihydrate having a mean particle size of 4μ |
| Clay | Kaolin clay having a mean particle size of 10μ |
| Graphite A | Graphite having a mean particle size of 32μ |
| Graphite B | Graphite having a mean particle size of 26μ |
| Binder | Methylcellulose binder |
| Lubricant | Aluminum tri-stearate lubricant |

TABLE 2

| | Batch Compositions | | | | | |
| --- | --- | --- | --- | --- | --- | --- |
| | EX. 1 (comparative) Weight % | EX. 2 (comparative) Weight % | EX. 3 Weight % | EX. 4 Weight % | EX. 5 Weight % | EX. 6 Weight % |
| Talc A | 38.52 | — | 40.80 | — | 40.80 | — |
| Talc B | — | 38.52 | — | 40.80 | — | 40.80 |
| Silica A | 15.38 | — | — | — | — | — |
| Silica B | — | 15.38 | 16.29 | 16.29 | 16.29 | 16.29 |
| Alumina A | 12.27 | — | 13.00 | — | 13.00 | — |
| Alumina B | — | 12.27 | — | 13.00 | — | 13.00 |
| Alumina C | | | 16.31 | 16.31 | 16.31 | 16.31 |
| Aluminum Trihydrate | 20.99 | 20.99 | — | — | — | — |
| Clay | 12.84 | 12.84 | 13.60 | 13.60 | 13.60 | 13.60 |
| Binder | 5.50 | 3.89 | 6 | 6 | 6 | 6 |
| Lubricant | 1.00 | 0.55 | 1 | 1 | 1 | 1 |
| Pore Formers | Weight % (super-addition) | Weight % (super-addition) | Weight % (super-addition) | Weight % (super-addition) | Weight % (super-addition) | Weight % (super-addition) |
| Graphite A | 80 | — | — | — | 50 | 50 |
| Graphite B | — | 80 | 50 | 50 | — | — |

Honeycomb samples of 2.5 cm and 5 cm diameter were extruded from each of the batch mixtures reported in Tables 1 and 2 above, and the extruded green honeycombs were then dried and then fired in a Lindberg II electric box furnace for a period of approximately 21 hours to a maximum firing temperature of approximately 1410° C.

The physical properties of fired extruded honeycombs produced from these batch mixtures are then determined with the results reported in Table 3 below. Included in Table 3 are data respecting honeycomb porosity (volume % of pores), mean pore size (μm), average coefficients of thermal expansions (CTE), rod modulus of rupture strengths (MOR) as determined on fired (54-hour fired) rods of each batch composition, and axial x-ray diffraction I-ratios. Powder x-ray diffraction analyses are also run to detect the presence of any secondary phases, including alumina, cordierite, mullite and spinel, in the fired honeycombs.

Rod modulus of rupture strengths are measured in the 4-point deflection mode. The axial X-ray I-ratios are measured on axial, as-fired ceramic wall surfaces. Coefficients of thermal expansion (CTEs) are mean coefficients of thermal expansion from 25 to 800° C. in units of $10^{-7}$° $C.^{-1}$ measured by dilatometry parallel to the lengths of the extruded articles. Mean pore size is the pore size above and below which 50% of the pore volume of the sample resides.

TABLE 3

Physical Properties of Cordierite Honeycombs

| | | EX. 2 (comparative) | EX. 3 | EX. 4 | EX. 5 | EX. 6 |
|---|---|---|---|---|---|---|
| Diameter (in) | | 1 | 1 | 1 | 2 | 1 |
| Porosity (%) | | 70 | 65 | 60 | 64 | 62 |
| Mean Pore Size (μm) | | 23 | 23 | 32 | 24 | 26 |
| CTE | | 10.7 | 10.5 | 13.9 | 11.5 | 12.8 |
| Rod MOR (PSI) | | 502 | 850 | — | — | — |
| Axial XRD I-Ratio ($I_A$) | | 0.39 | 0.44 | 0.47 | 0.43 | 0.47 |
| Powder XRD I-Ratio | | 0.64 | 0.65 | 0.65 | 0.63 | 0.65 |
| Transverse XRD I-Ratio ($I_T$) | | 0.85 | 0.83 | 0.81 | 0.82 | 0.85 |
| XRD | Alumina | 1.3 | 0.0 | 0.0 | 0.0 | 0.0 |
| $2^{nd}$ | Cordierite | 92.0 | 93.0 | 94.0 | 93.0 | 95.0 |
| Phase | Mullite | 1.4 | 0.0 | 1.0 | 0.9 | 0.7 |
| | Spinel | 50 | 6.2 | 5.0 | 5.6 | 3.7 |

The coarse transition alumina ($d_{50}$=15.8 μm) utilized in the above-described batch mixtures is thought to present a different surface chemistry than conventional fine hydrated alumina. The in-situ porosity generated by the former helps enable the reduction in the graphite super-addition from 80 to 50% while at the same time helping to increase the mechanical strength (rod MOR) of the ceramics (in one case by 70%), and to maintain an acceptable CTE in the fired ceramics.

An important indicator of ceramic filter performance that is impacted by filter porosity is exhaust gas pressure drop across the filter. Increased pressure drops increase back pressure within the exhaust system and reduce the efficiency of the engine. FIG. 1 of the drawing presents filter pressure drop data over a range of artificial soot loadings for cordierite filter samples having compositions like those of comparative Example 2 (C) and inventive Example 5 (I) from Table 2 above. The very similar pressure drops observed indicate similar pore morphology in the two samples despite the much lower pore former concentration utilized to prepare the inventive filter sample.

Figure 2:
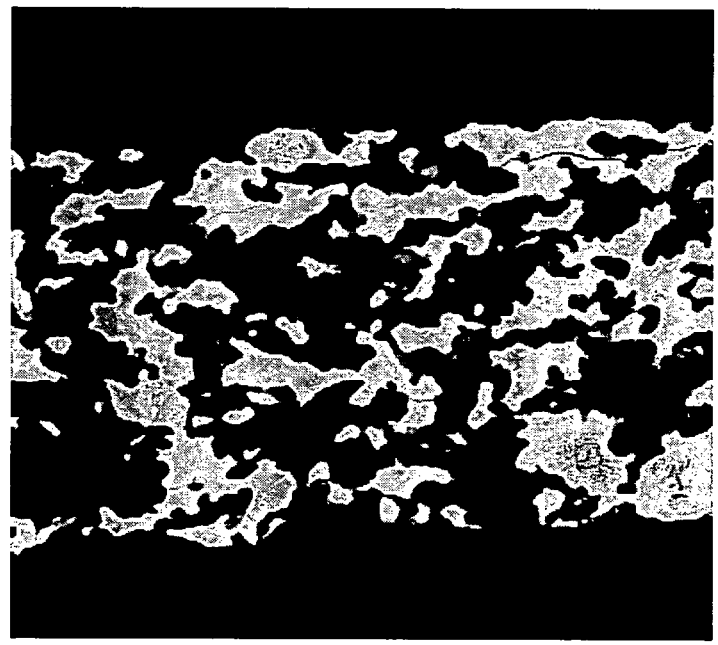
FIG. 2 is a scanning electron micrograph taken at 250× magnification of a cross-section of cordierite ceramic article in accordance with prior art.
Figure 3:
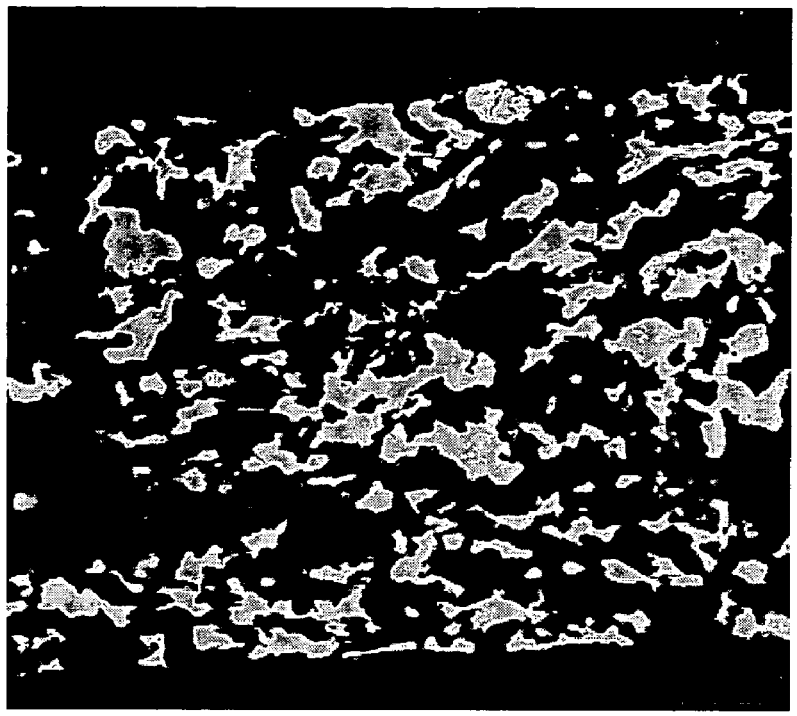
FIG. 3 is a scanning electron micrograph taken at 250× magnification of a cross-section of a second ceramic article made in accordance with prior art.
Figure 4:
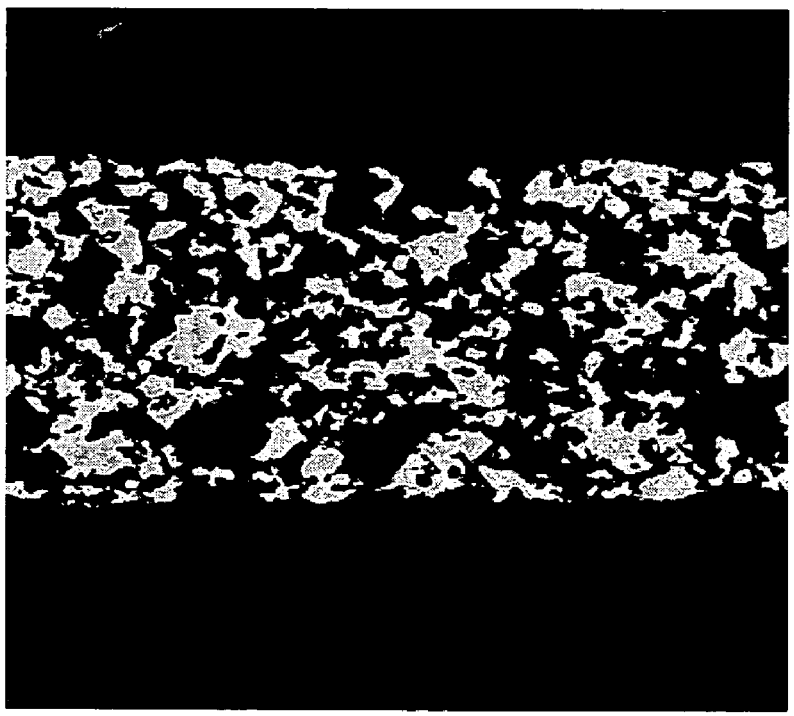
FIG. 4 is a scanning electron micrograph taken at 150× magnification of a cross-section of a further ceramic article made according to the invention.

Photomicrographs comparing the porosities of fired cordierite ceramics are presented in FIGS. 2-4 of the drawings. FIGS. 2 and 3 are photomicrographs at a magnification of 250× of cross-sections of cordierite ceramic samples made without the addition of coarse transition aluminas in accordance with prior art. FIG. 4 is a photomicrograph at a magnification of 150× of a cross-section of a cordierite ceramic sample made from a batch like that of Example 3 in Table 2 above. Again the similarities in porosity and pore size distribution despite the differences in ceramic batch composition as between FIG. 4 and FIGS. 2 and 3 are evident.

Although the invention has been described above with reference to specific examples of materials and methods for the practice thereof, it will be apparent from that description that the examples are offered simply to illustrate the wider ranges of materials and methods that may be adapted for the practice of the invention within the scope of the appended claims.

We claim:

1. A batch composition for the manufacture of a porous cordierite ceramic article comprising:
   a mixture of (i) oxide sources of magnesia, alumina and silica in proportions effective to yield a ceramic article incorporating a predominant cordierite ($Mg_2Al_4Si_5O_{18}$) crystal phase upon firing, (ii) one or more binders and lubricants, and (iii) a pore former in a proportion effective to develop a porosity of at least 50% by volume in the porous cordierite ceramic upon firing,
   the oxide source of alumina including at least one alumina powder having a mean particle size in the range of 15-50 μm and a surface area of at least 100 $m^2$/g, and
   the pore former being present in amount less than 80% by weight calculated as a super-addition to the batch.

2. The batch of claim 1, wherein the alumina powder includes an alumina selected from the group consisting of amorphous, flash calcined alumina and gamma, chi, kappa, delta, and theta transition aluminas and has a surface area of at least 300 $m^2$/g.

3. The batch of claim 1 comprising, in weight percent, 11-15% clay, 37-42% talc, 14-18% silica, 12-18% of a coarse transition alumina, and 28-34% total of transition and other aluminas, up to 10% of cellulosic binders, and up to 3% of lubricants.

4. The batch of claim 3 comprising 12-18% by weight of a coarse transition alumina.

5. The batch of claim 1 wherein the pore former is graphite and is present in amount of up to 50% by weight calculated as a super-addition to the batch.

6. A method for making a porous cordierite ceramic article, comprising the steps of:
   compounding a batch comprising a mixture of (i) a pore former in an amount effective to develop a porosity in excess of 50% by volume in the porous ceramic article and (ii) oxide sources of magnesia, alumina, and silica in proportions effective to yield cordierite ($Mg_2Al_4Si_5O_{18}$) upon firing, the sources of alumina including a powdered transition alumina having a mean particle size of 15-50 μm and a surface area of at least 100 $m^2$/g;
   forming the batch into a preform for a ceramic article; and
   firing the preform to form a porous cordierite ceramic article.

7. The method of claim 6 wherein the batch comprises, in weight percent, 11-15% clay, 37-42% talc, 14-18% silica, 12-18% of a coarse transition alumina, 28-34% total of coarse transition and other aluminas, up to 10% of cellulosic binders, up to 3% of lubricants, and a super-addition of a pore former in an amount less that 80% by weight.

8. The method of claim 6 wherein the step of compounding the batch comprises the additional steps of adding a water vehicle to the pore former and oxide sources of the mixture, and mixing to form a plasticized batch.

9. The method of claim 6 wherein the step of firing the preform is carried out in the absence of firing atmosphere controls.

10. The method of claim 6 wherein said pore forming agent is present in the batch in an amount not exceeding 50% by weight, calculated as a super-addition to the batch.

11. The method of claim 6 wherein said pore forming agent is added in an amount of 30-50% by weight, calculated as a super addition to the batch.

12. The method of claim 6 wherein the powdered transition alumina is selected from the group consisting of gamma, chi, kappa, delta, and theta aluminas.

* * * * *

UNITED STATES PATENT AND TRADEMARK OFFICE
CERTIFICATE OF CORRECTION

PATENT NO. : 7,541,303 B2 Page 1 of 1
APPLICATION NO. : 11/316294
DATED : June 2, 2009
INVENTOR(S) : William Peter Addiego et al.

It is certified that error appears in the above-identified patent and that said Letters Patent is hereby corrected as shown below:

*Col.*  *Line*  *Description*
8  26  "The batch of claim 3" should be -- The batch of claim 1 --.

Signed and Sealed this

Eleventh Day of May, 2010

David J. Kappos
*Director of the United States Patent and Trademark Office*